(12) United States Patent
Missett et al.

(10) Patent No.: US 9,185,042 B2
(45) Date of Patent: Nov. 10, 2015

(54) SYSTEM AND METHOD FOR AUTOMATED QUALITY OF SERVICE CONFIGURATION THROUGH THE ACCESS NETWORK

(71) Applicant: Calix, Inc., Petaluma, CA (US)

(72) Inventors: Shaun Noel Missett, Avon, CT (US); Berkay Baykal, Westborough, MA (US)

(73) Assignee: Calix, Inc., Petaluma, CA (US)

( * ) Notice: Subject to any disclaimer, the term of this patent is extended or adjusted under 35 U.S.C. 154(b) by 168 days.

(21) Appl. No.: 14/013,982

(22) Filed: Aug. 29, 2013

(65) Prior Publication Data
US 2015/0063107 A1   Mar. 5, 2015

(51) Int. Cl.
*H04L 12/56* (2006.01)
*H04L 12/28* (2006.01)
*H04L 12/815* (2013.01)
*H04L 12/721* (2013.01)

(52) U.S. Cl.
CPC ............. *H04L 47/22* (2013.01); *H04L 45/66* (2013.01)

(58) Field of Classification Search
CPC ... H04L 12/42; H04L 12/4641; H04L 47/125; H04L 47/2408; H04L 2012/568
USPC .............................. 370/235, 395.53, 408, 412
See application file for complete search history.

(56) References Cited

U.S. PATENT DOCUMENTS

| | | | |
|---|---|---|---|
| 6,438,134 B1 * | 8/2002 | Chow et al. | 370/412 |
| 8,111,702 B1 * | 2/2012 | Wijnands et al. | 370/400 |
| 2005/0047415 A1 * | 3/2005 | Channegowda et al. | 370/395.4 |
| 2006/0026192 A1 * | 2/2006 | Li et al. | 707/102 |
| 2007/0212071 A1 * | 9/2007 | Guo et al. | 398/69 |
| 2009/0222242 A1 * | 9/2009 | Kodama | 702/188 |
| 2011/0080915 A1 * | 4/2011 | Baykal et al. | 370/395.53 |

\* cited by examiner

*Primary Examiner* — Edan Orgad
*Assistant Examiner* — Vanneilian Lalchinthang
(74) *Attorney, Agent, or Firm* — Fogg & Powers LLC

(57) ABSTRACT

A system comprises a plurality of access nodes configured to provide one or more services to customer equipment; and a plurality of transport elements coupled together to form a network. Each transport element is configured to receive data packets committed to the network by one or more of the other transport elements and to commit data packets to the network, each data packet assigned to one of a plurality of traffic classes. Each respective transport element is further configured to shape a first set of traffic comprising data packets received from another transport element based on the respective traffic class of each data packet and to shape a second set of traffic comprising data packets to be committed to the network by the respective transport element based on the respective traffic class of each data packet, the first set of traffic shaped separately from the second set of traffic. Each respective transport element is further configured to shape the shaped first set of traffic together with the shaped second set of traffic based on respective weights associated with the first set of traffic and the second set of traffic.

20 Claims, 6 Drawing Sheets

SYSTEM AND METHOD FOR AUTOMATED QUALITY OF SERVICE CONFIGURATION THROUGH THE ACCESS NETWORK

BACKGROUND

An access network is part of a telecommunications network which connects subscribers to a service provider. An access network may comprise a plurality of nodes. Each of the nodes has to be configured with various attributes such as timing configuration to synchronize the network nodes or elements to a common clock, and quality of service settings to ensure that the services are provided appropriate prioritization and the available bandwidth is distributed fairly.

SUMMARY

In one embodiment, a system is provided. The system comprises a plurality of access nodes configured to provide one or more services to customer equipment; and a plurality of transport elements coupled together to form a network. Each transport element is configured to receive data packets committed to the network by one or more of the other transport elements and to commit data packets to the network, each data packet assigned to one of a plurality of traffic classes. Each respective transport element is further configured to shape a first set of traffic comprising data packets received from another transport element based on the respective traffic class of each data packet and to shape a second set of traffic comprising data packets to be committed to the network by the respective transport element based on the respective traffic class of each data packet, the first set of traffic shaped separately from the second set of traffic. Each respective transport element is further configured to shape the shaped first set of traffic together with the shaped second set of traffic based on respective weights associated with the first set of traffic and the second set of traffic.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
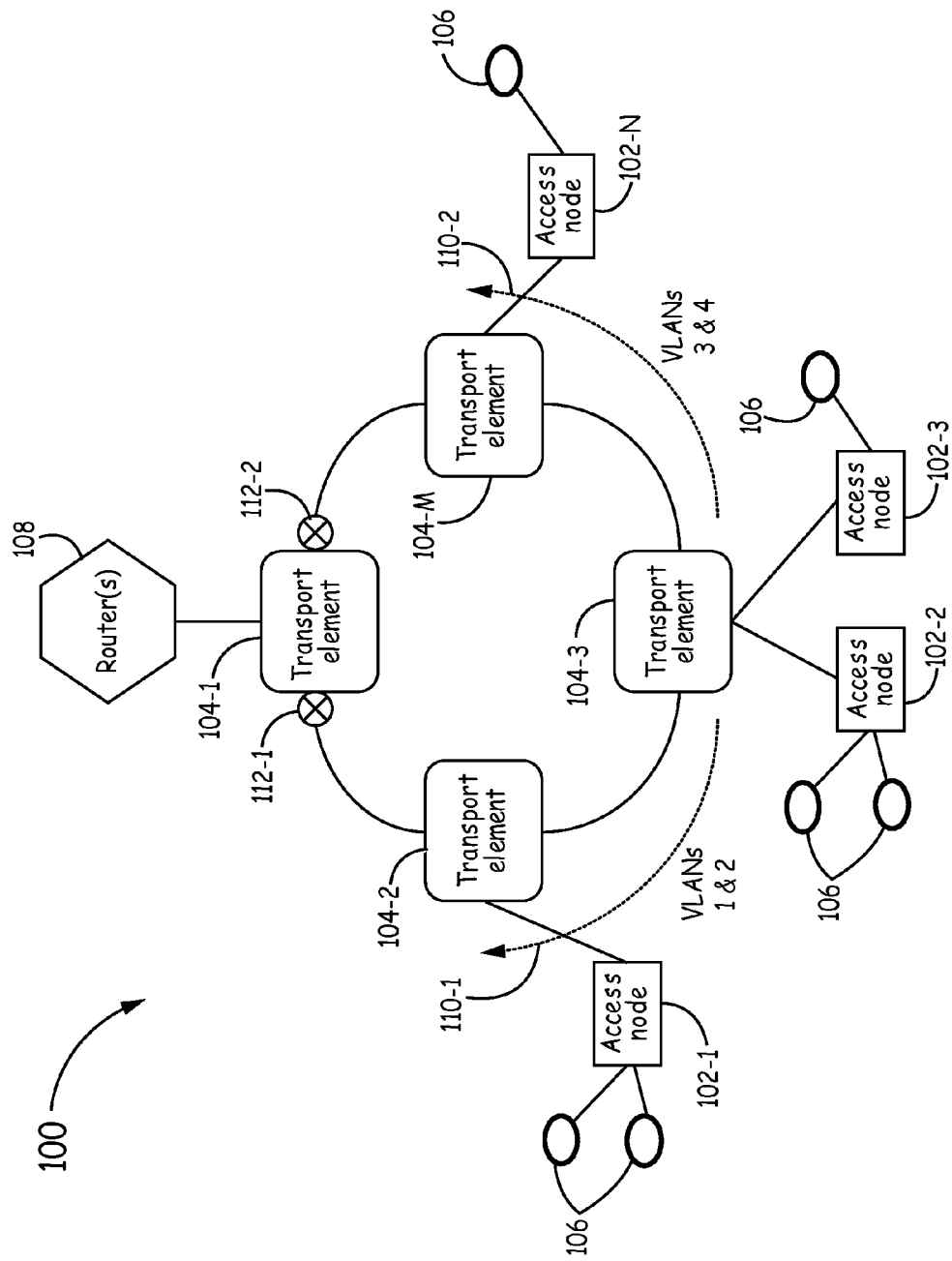
FIG. 1 is a block diagram of one embodiment of an exemplary network.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is a high level block diagram of one embodiment of an exemplary network 100. Network 100 is a layer 2 access network implemented using a ring network topology. It should be noted that, as used herein, discussion of layers refers to layers of the Open Systems Interconnection Reference Model (OSI Reference Model or OSI Model). For example, layer 2 refers to the data link layer of the OSI model. Network 100 comprises a plurality of access nodes 102-1 . . . 102-N, each of the access nodes 102 coupled to one of a plurality of transport elements 104-1 . . . 104-M (also referred to herein as aggregation nodes or network nodes). Each of the access nodes 102 is configured to provide one or more services to customer equipment 106, such as voice services (e.g. voice over Internet Protocol) and data services.

The transport elements 104 are configured to create a loop free topology around the ring to transport packets (e.g. Ethernet packets) from the access nodes 102 towards one or more routers 108 which provide connection to a layer 3 network. The term "loop free" means that data does not travel a complete circle or loop around the ring to return to the transport element 104 which originally placed the data on the ring network. In particular, the transport elements 104 are configured to implement a protocol to manage the loop free ring topology, such as, but not limited to Rapid Spanning Tree Protocol (RSTP), Multiple Spanning Tree Protocol (MSTP), or G.8032 Ethernet Ring Protection Switching (ERPS). It is to be understood that any protocol configured to create one or more loop free domains around the ring topology of network 100 can be used.

In embodiments where multiple domains are supported by the topology protocol, traffic needs to be partitioned between these domains. As used herein, a domain includes the transport elements 104 configured to communicate data in a given direction around the ring. In some embodiments, a Virtual Local Area Network (VLAN) space comprising a plurality of VLANs is used, where a subset of the total number of VLANs is assigned to a given domain.

For example, in FIG. 1, VLANs originating at transport element 104-3 are distributed to two domains defined on the ring equally. The first domain includes traffic transported in a first direction 110-1 and the second domain includes traffic transported in a second direction 110-2. In particular, in this example there are four VLANs (VLANs 1, 2, 3, and 4) originating at transport element 104-3. VLANs 1 and 2 are assigned to the first domain in this example. VLANs 3 and 4 are assigned to the second domain in this example.

Although four VLANs are described in this embodiment, it is to be understood that any number of VLANs can be used in other embodiments. Similarly, it is to be understood that the number of transport elements 104, access nodes 102, routers 108 and customer equipment 106 shown in FIG. 1 are provided by way of example only. In addition, although access nodes 102 and transport elements 104 are shown and described herein as separate devices, it is to be understood that the functionality of an access node can be combined with the functionality of a transport element in a single device in other embodiments.

VLANs 1-4 provide the transport between the router(s) 108 and the respective access node 102 for the subscriber/ service traffic. Each VLAN is defined on all transport elements 104 that participate in carrying the respective VLAN's traffic. The origination point (either router 108 or the respective transport element 104) and the termination point (either router 108 or the respective transport element 104) are manually provisioned for the respective VLAN. That is, an interface is associated with each VLAN at the origination and termination points. Interim transport elements 104 between the origination and termination points are also manually provisioned in some embodiments. In other embodiments, the interim transport elements dynamically learn the existence of the respective VLANs through a VLAN registration protocol.

In this example, each VLAN is associated with interfaces for both the first direction 110-1 and the second direction 110-2 around the ring to accommodate traffic flow in either direction. One of the transport elements 104 is designated as the ring master (also referred to herein as a master node). In this example, transport element 104-1 is the ring master. The ring master 104-1 blocks respective VLANs on at least one of its interfaces to ensure a loop free layer 2 topology. For example, the ring master 104-1 blocks a first subset of data packets associated with VLANs 3 and 4 at interface 112-1 and blocks a second subset of data packets associated with VLANs 1 and 2 at interface 112-2, in this embodiment. Each of the transport elements 104 around the ring, over time, learns the topology and only forwards the traffic in one direction for a given VLAN. Hence, in this example, during startup when the layer 2 bridge tables are not populated, traffic for each VLAN is flooded on both directions.

The ring protocol makes decisions around which VLAN is going to be on which ring domain and takes the appropriate actions to create the loop free topology for that VLAN. In one example, the VLANs are manually assigned to a respective domain. In another embodiment, VLAN registration protocols are used to automate the assignment of VLANs to the transport elements and ring domains using different heuristics such as, but not limited to, bandwidth based load balancing. Additional details regarding automated VLAN assignment are described in co-pending U.S. patent application Ser. No. 12/575,014 which is hereby incorporated herein by reference.

In an alternative embodiment, the traffic is partitioned between domains based on the Class of Service (CoS) field within the header of the respective layer 2 Ethernet frames. Additionally, in some embodiments, the VLAN space and CoS can both be used to partition traffic, where the VLAN are associated with a specific, or range of, CoS.

Figure 2:
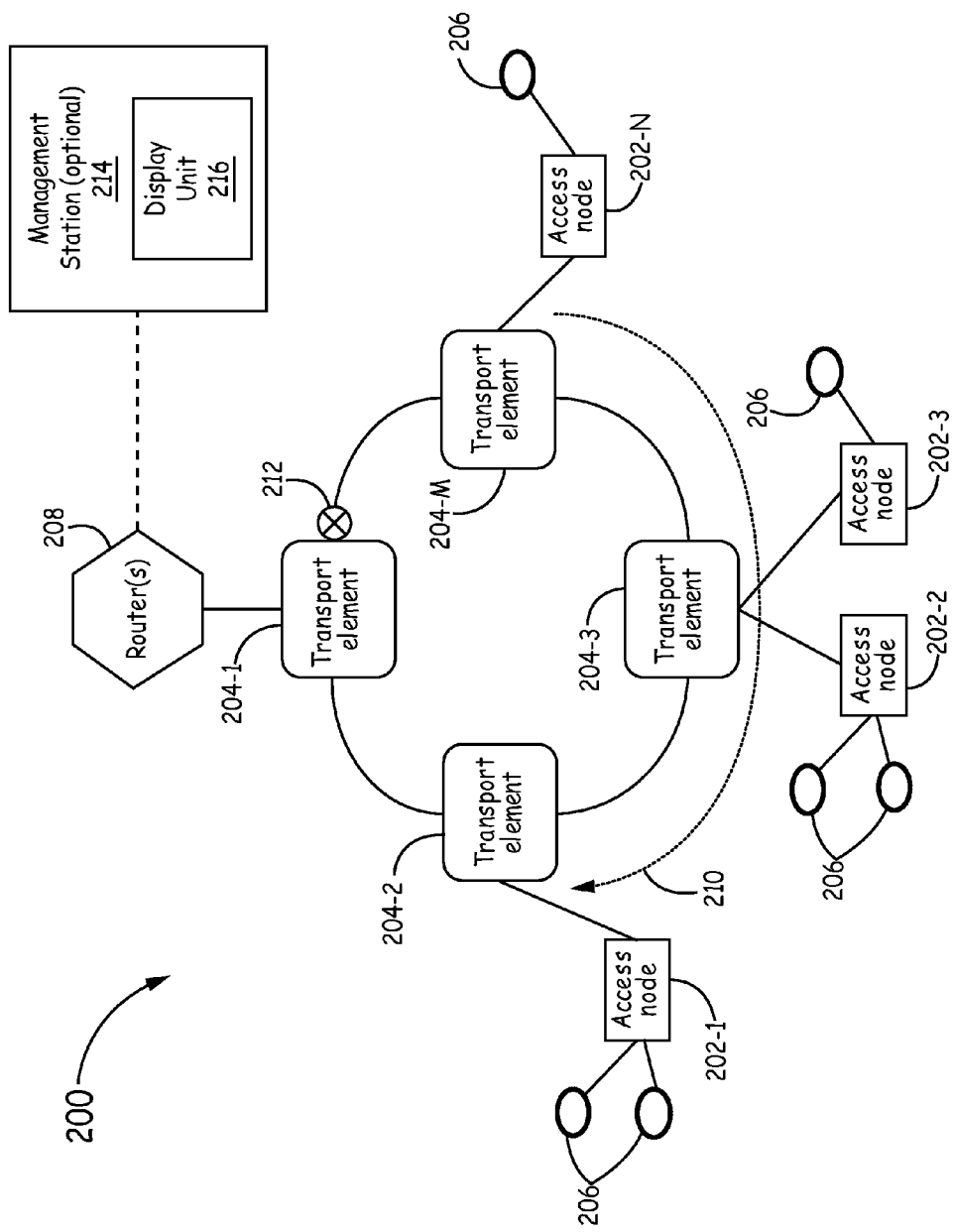
FIG. 2 is a block diagram of another embodiment of an exemplary network.

Furthermore, in another alternative embodiment, a single domain is instantiated such that all traffic flows in a single direction, as shown in the exemplary network 200 in FIG. 2. In particular, the ring master 204-1 blocks traffic on interface 212 such that all traffic flows in direction 210.

Network 100 and network 200 are also configured to automate the management of Quality of Service (QoS) configuration on a ring, as described in more detail below. For example, network 100 and network 200 are configured to improve fairness in bandwidth allocation for the transport elements as described in more detail below. For purposes of explanation, the description of managing QoS configuration on a ring is described with respect to FIG. 2 having a single domain. However, it is to be understood that the following description is also applicable to a network having multiple domains such as in network 100 of FIG. 1.

In this example, three classes of service are used. However, it is to be understood that fewer or more than three classes of service can be used in other embodiments. In this embodiment, the three exemplary classes are referred to herein as Real-time, Guaranteed Data, and Best Effort. The Real-time CoS is used for traffic requiring little to no delay. The Guaranteed Data CoS is guaranteed a specific predetermined data rate so as not to exceed a maximum delay. The Best Effort CoS does not have a guaranteed data rate and is transmitted as bandwidth permits. Stated another way, the Real-time CoS has a high priority, the Guaranteed Data CoS has a medium priority, and the Best Effort CoS has a low priority. The assignment of traffic to a particular class of service is dependent on the particular implementation.

Each of the three exemplary classes of service also includes at least one of the following components: committed information rate (CIR), committed burst size (CBS), excess information rate (EIR) and excess burst size (EBS). Committed information rate, committed burst size, excess information rate, and excess burst size are terms known to one of skill in the art and are not described in more detailed herein. Each class of service does not necessarily contain each of the above components. For example, real-time data includes CIR and is guaranteed the rate specified by the CIR between the subscriber and the network represented by the router 208. Guaranteed data includes both CIR and EIR components. The CIR component of the guaranteed data is guaranteed, but the EIR component is treated as best effort traffic at a higher priority. Best effort traffic is comprised of only an EIR component and does not have any rate guarantees.

In the example topology of FIG. 2, the ring can be visualized as a linear chain that starts with transport element 204-M and ends at transport element 204-1 because traffic flows in only one direction from transport element 204-M to transport element 204-1. Each transport element 204, except for transport element 204-M, has two kinds of traffic: transit traffic and local traffic. Transit traffic is traffic that is already on the ring and received by the respective transport element 204. Local traffic, also referred to herein as add-in traffic, is traffic that the respective transport element 204 is committing to the ring or network.

Local and transit traffic compete for bandwidth. Therefore, in configuring the network, an operator has to make choices between not only the quality of service traffic rules on each interface but also between transit and local traffic. In particular, it is desirable to ensure that the traffic priorities are preserved and that there is fairness between the traffic of all the transport elements 204. As used herein, fairness refers to enabling each transport element 204 to have approximately the same access to the available bandwidth as other transport elements 204 regardless of the location of the respective transport element 204 in the ring network. However, conventional systems do not provide sufficient fairness between all the transport elements 204, especially when the network is congested. For example, in a conventional system, if the total amount of traffic from all classes exceeds the capacity of the network, transport elements at the start of the domain (e.g. transport element 204-M) have an advantage in committing traffic to the network over transport elements at the other end of the domain (e.g. transport element 204-1). This is because the network is not congested at the start of the domain near transport element 204-M, whereas when transport element 204-1 attempts to commit local traffic, the network is already congested.

To alleviate the above fairness problem, network 200 is configured to take into account fair use of available capacity between all transport elements 204. In particular, one of the transport elements is designated as the ring master (i.e. transport element 204-1 in this example). The ring master 204-1 is configured to be aware of the capacity needs of each transport element and the respective traffic types. Hence, the ring master 204-1 can facilitate the effective use of the available ring capacity using either manual configuration under the control of the operator or using a more automated approach such as described in U.S. patent application Ser. No. 12/575,014. The ring master 204-1 keeps track of all committed VLANs and their bandwidth requirements and configures each transport element 204 with a two-stage shaper to facilitate fair use of capacity per the QoS policies.

Figure 3:
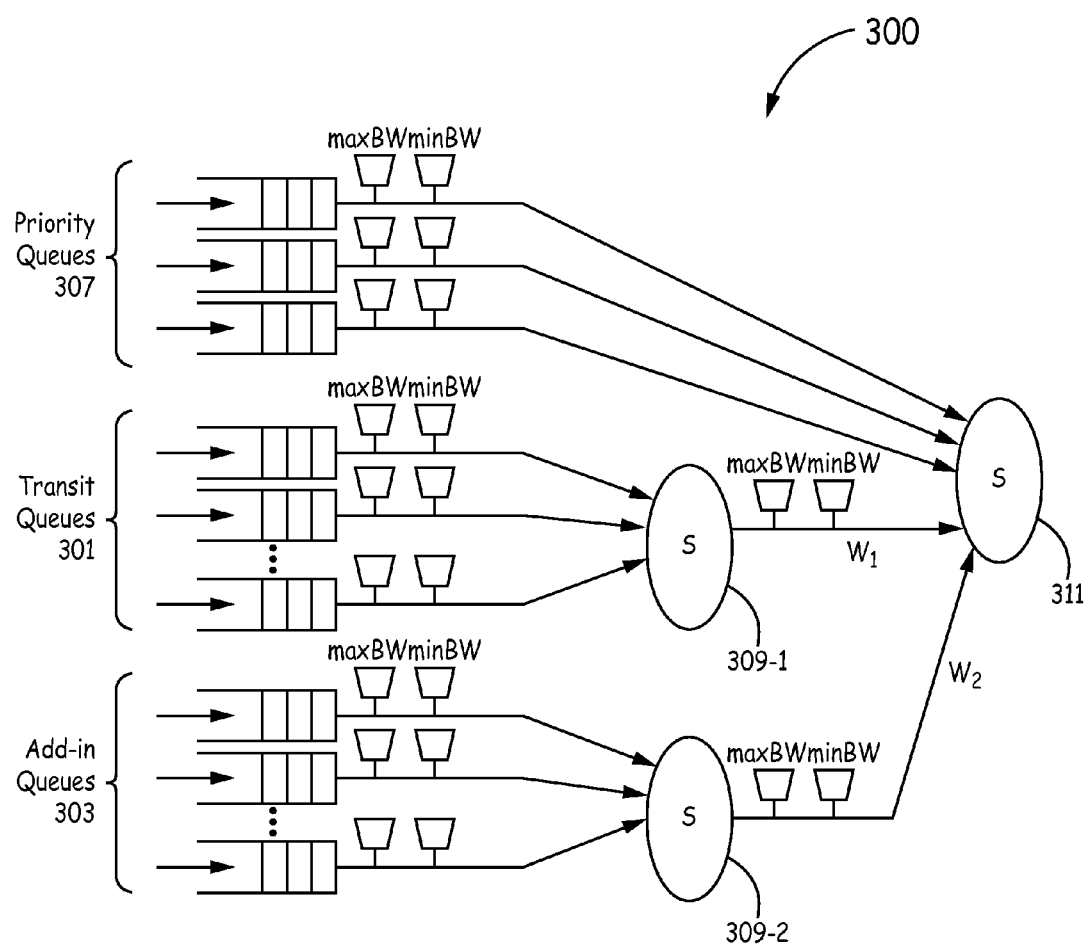
FIG. 3 is an exemplary diagram depicting one embodiment of an exemplary two-stage shaper.

FIG. 3 is a diagram of an exemplary two-stage shaper 300 implemented on each transport element 204. The shaper 300 includes a plurality of transit queues 301. In particular, there is a transit queue 301 for each class of traffic. Similarly, the shaper 300 includes a plurality of add-in or local traffic queues 303, one for each class of traffic. The first stage shaper 309-1 shapes the transit traffic from the plurality of transit queues 301. The first stage shaper 309-2 shapes the local traffic from the plurality of add-in queues 303. Thus, the transit traffic is shaped separately from the local traffic.

Each transit queue 301 and add-in queue 303 can be associated, in some embodiments, with a respective minimum bandwidth requirement and/or maximum bandwidth requirement which the respective first stage shaper 309 uses in shaping the respective traffic. The bandwidth or rate requirements effectively guarantee committed information rates for that particular queue. The bandwidth requirements or parameters for each respective transport element 204 can be determined by the ring master 204-1 and communicated to each respective transport element 204. For example, the ring master 204-1 collects information on committed services (VLANs) to the ring and the class of service and bandwidth profile of these services per transport element and configures the transport elements 204 on the ring accordingly. Thus, the ring master 204-1 knows the ring topology, path of the traffic and traffic committed by each node and distribution of this traffic to each class of service.

The shaped transit traffic and the shaped local traffic are then fed into the second stage shaper 311 which schedules the traffic onto the ring. The output of each respective first stage shaper 309 can also be configured with a minimum bandwidth requirement and/or maximum bandwidth requirement based on configuration data received from the ring master 204-1. The bandwidth requirements are used by the second stage shaper 311 in shaping the traffic. In addition, the output of each respective first stage shaper 309 is associated with a weight, in some embodiments. Hence, the second stage shaper 311, in such embodiments, implements a weighted round robin scheduling. In this example, the output of first stage shaper 309-1 has a weight W1 while the output of first stage shaper 309-2 has a weight W2. The weights are also assigned by the ring master 204-1 in some embodiments.

In particular, in some embodiments, the weights are based on the relative location of the respective transport element 204 in the ring topology. For example, transport element 204-3 has only one transport element 204-M preceding it in the direction of data flow. Thus, for transport element 204-3, the weights W1 and W2 are equal in this example as there is one node providing transit traffic and one node providing add-in traffic. However, for transport element 204-2, weight W1 is twice the value of weight W2 since there are two transport elements preceding transport element 204-2 and providing transit traffic. Thus, through the use of two stages in shaping traffic as described herein bandwidth on the network 200 is more fairly allocated among the plurality of transport elements 204.

In addition, the shaper 300 also includes one or more high priority queues 307 for traffic that is to be directly committed to the ring network without shaping. Such traffic includes, but is not limited to, voice traffic, which requires low latency and jitter, and ring management traffic, which has a very high priority. The traffic from the high priority queues 307 is directly committed to the ring using strict priority scheduling in the second stage shaper 311 to reduce delay and delay variation. Thus, in addition to enabling a fairer arbitration of traffic between the plurality of transport elements 204 than in conventional systems, the shaper 300 also enables some traffic to be directly committed to the ring.

In addition, a switchover in ring topology can result in reversal of the traffic in the opposite direction, or a breakage in the topology (e.g. a fiber cut) may create two linear chains or domains from a single domain. In each case, the ring master 204-1 is configured to assess whether the ring is intact or, if not, where the breakage happened and re-install the QoS rules. As an interim step, the ring can default to strict priority scheduling, in some embodiments, until the QoS rules can be re-established.

Although a ring master 204-1 is used in the above example, other embodiments do not utilize a centralized node/ring master or VLAN registration protocol. In other words, the use of a centralized node and VLAN registration protocol is one exemplary technique to achieve auto-configuration of QoS for fair traffic distribution. As another example, if each transport element 204 is an integrated aggregation and access node, propagation of traffic capacity can be achieved without using VLAN registration protocol. Likewise each transport element 204 can communicate its traffic load per class of service to its neighbor using a link local protocol. In such embodiments, transport elements 204 add transient traffic to their traffic load to account for all traffic.

In addition, in some embodiments, a management station 214 is optionally included. The management station 214 includes a display 216 capable of displaying data regarding the utilization of the ring 200 in real-time per node per class of service. In addition, the real-time data can be compared against expected (configured) traffic to manage oversubscription. The management station 214 receives the data from the transport elements 204 via the layer 3 network coupled to the router 208, in some embodiments. For example, in some embodiments, the transport elements 204 send packets to update a shared Management Information Base (MIB) from which the management station 214 obtains the utilization data.

Figure 4:
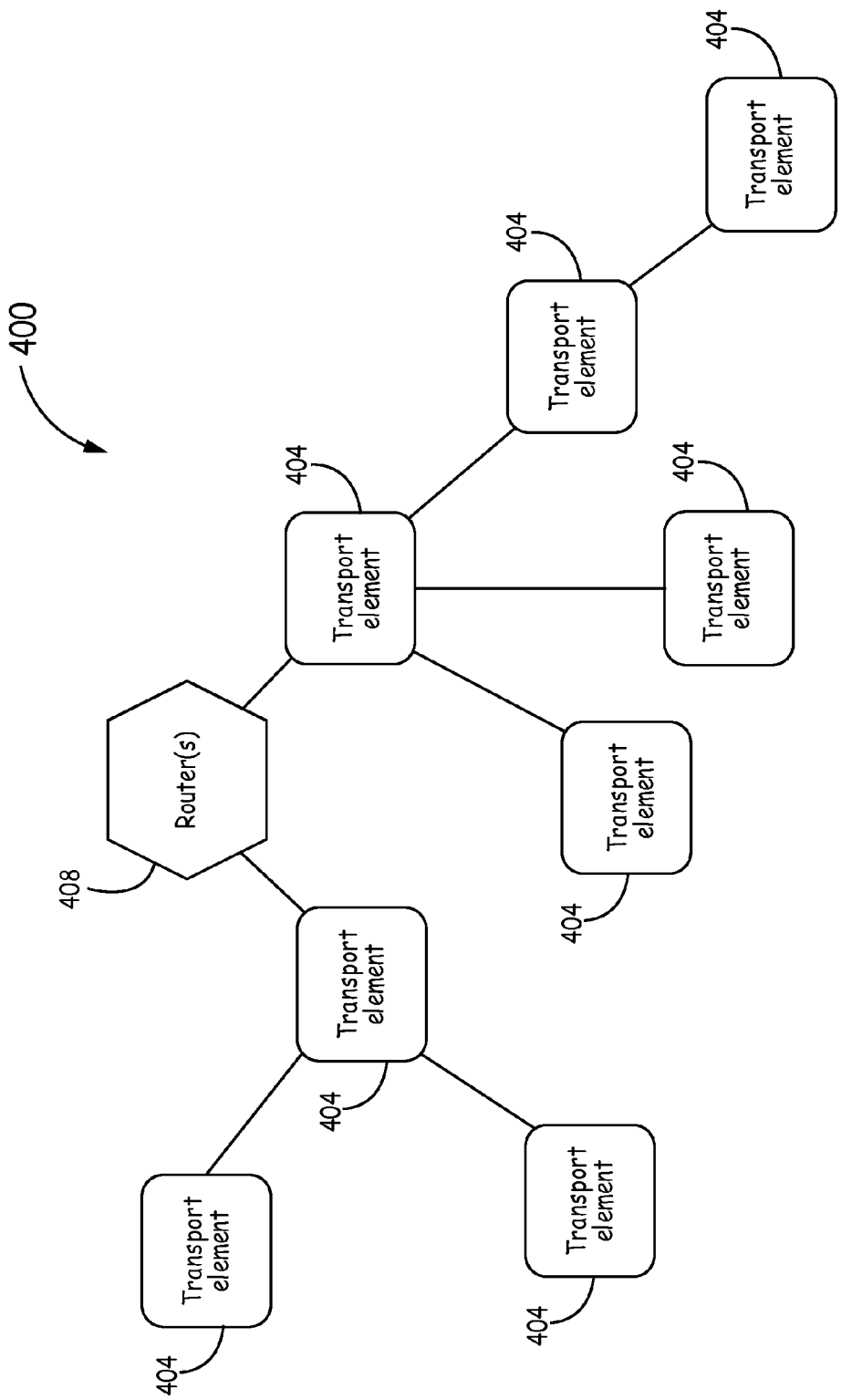
FIG. 4 is a block diagram of another embodiment of an exemplary network.

Furthermore, although the above examples are described in relation to a ring topology for purposes of explanation, it is to be understood that the techniques described above are also applicable to other topologies, such as, but not limited to, so-called "tree" topologies. In a tree topology, such as the exemplary tree network 400 shown in FIG. 4, each transport element 404 configures a two level hierarchy facing upstream toward the router 408. The first level represents traffic from a previous transport element 404 and the second level represents the traffic committed to the next transport element 404 within the tree 400. Thus, the two-level hierarchy shapes traffic similar to the two first-stage shapers discussed above. A VLAN registration protocol or a link level protocol is used, in some embodiments, to communicate traffic information through the tree network 400. In addition, link layer redundancy achieved through a topology protocol is taken into account in some embodiments. For example, if link aggregation protocol is used, two or more links that are part of a link group are represented as a single link.

Figure 5:
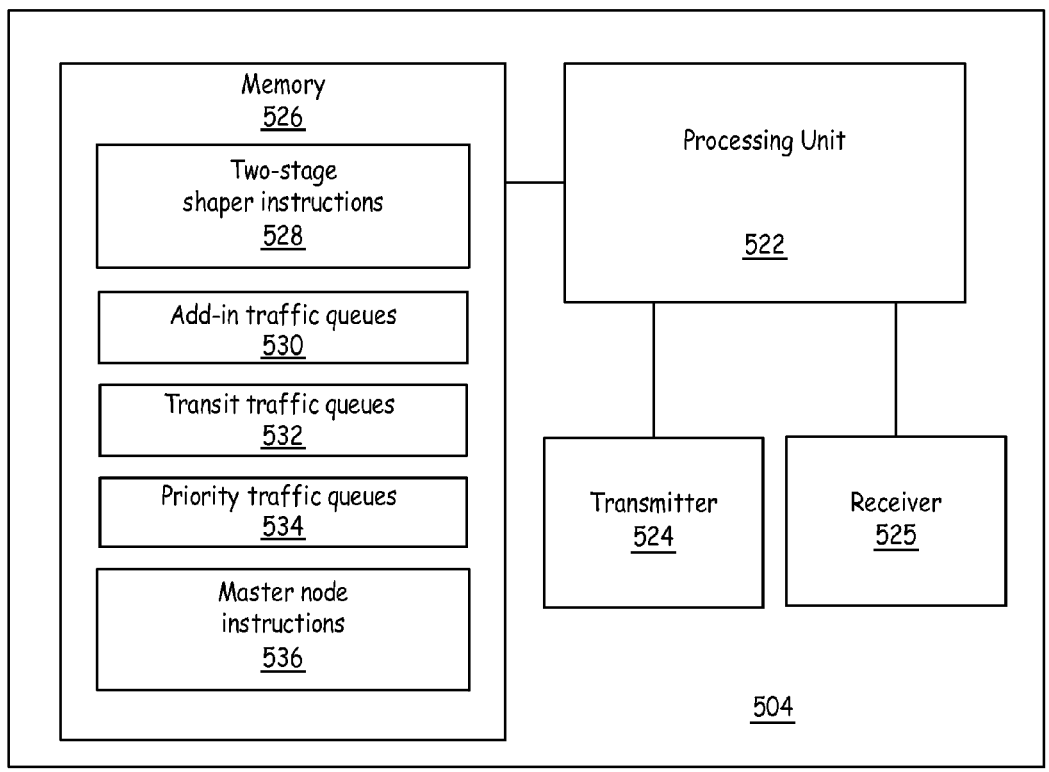
FIG. 5 is a block diagram of one embodiment of an exemplary transport element.

FIG. 5 is a high level block diagram of one embodiment of an exemplary transport element 504 which can be implemented in a network such as network 100, 200, or 400 described above. Transport element 504 includes a processing 522 coupled to a transmitter 524 configured to output traffic to a network, a receiver 525 configured to received traffic from the network, and a memory 526. Although a single receiver 525 and a single transmitter 524 are shown in FIG. 5, it is to be understood that the transport element 504 may include multiple interfaces for receiving and transmitting traffic on the network. It is also to be understood that transport element 504 can include other elements known to one of skill in the art that are not described herein. Hence, transport element 504 is provided by way of example only.

The processing unit 522 can be implemented as any suitable processing device, such as, but not limited to a Field Programmable Gate Array (FPGA), complex programmable logic device (CPLD), a field programmable object array (FPOA), a digital signal processor (DSP), or Application Specific Integrated Circuit (ASIC), etc. In addition, the processing unit 522 includes or functions with software programs, firmware or other computer readable instructions for carrying out various methods, process tasks, calculations, and control functions, used in the arbitrating between add-in and transit traffic, as discussed above.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc.

In particular, in this embodiment, memory 526 includes two-stage shaper instructions 528. The two-stage shaper instructions 528, when executed by the processing unit 522, cause the processing unit 522 to implement a two-stage shaper as discussed above with respect to FIG. 3. For example, the two-stage shaper instructions 528 cause the processing unit 522 to shape a first set of data packets and a second set of data packets separately. The first set of data packets comprising data to be committed to the network by the transport element 504 and the second set of data packets corresponding to data already on the network and received from other transport elements. The first and second set of data packets are each shaped based on the respective traffic class of data in the respective traffic queues of the first set of data packets and the second set of data packets, as discussed above. The instructions 528 also cause the processing unit 522 to shape the shaped first and second sets of data packets together based on respective weights corresponding to the first and second sets of data packets.

In this example, the add-in traffic queues 530, transit traffic queues 532, and priority queues 534 are stored on memory 526 for purposes of illustration. However, it is to be understood that, in other embodiments, the memory used for queues 530-534 is separate from the memory used to store two-stage shaper instructions 528. For example, in one embodiment, the instructions 528 are stored on a hard disk while the queues 530-534 are implemented on RAM. In addition, in this example, master node instructions 536 are stored on memory 526. The master node instructions 536 cause the processing unit 522 to perform the functions of the master node discussed above, such as gathering information regarding bandwidth usage at each transport element, communicating weights/parameters to the respective transport elements, and/or blocking subsets of traffic, e.g. VLANs, on one or more interfaces, as discussed above. It is to be understood that transport elements not configured as a master node do not need master node instructions 536.

Figure 6:
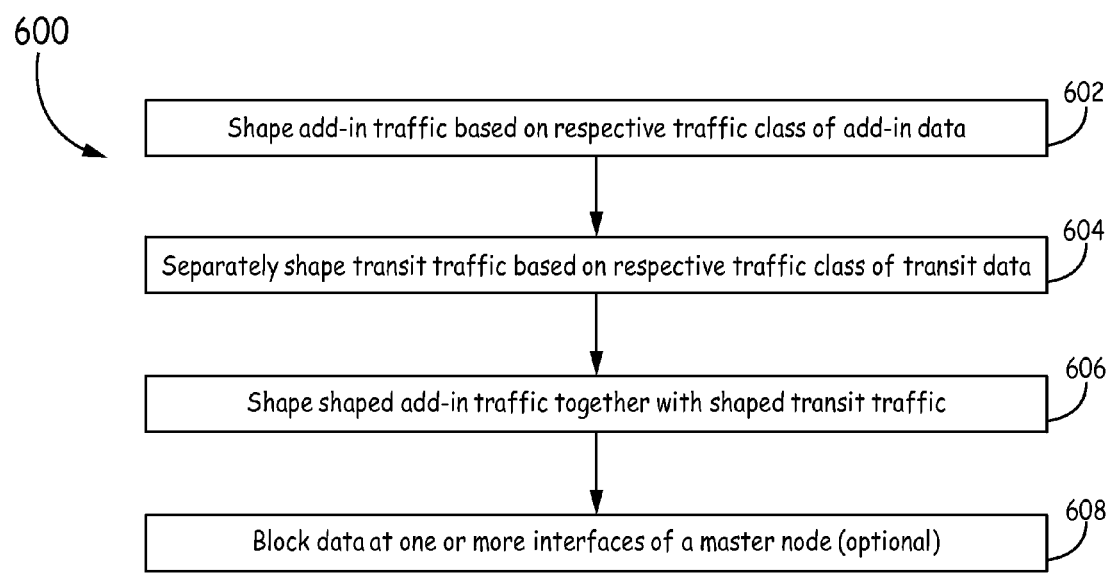
FIG. 6 is a flow chart depicting one embodiment of an exemplary method of allocating bandwidth in a network node.

FIG. 6 is a flow chart of one embodiment of an exemplary method 600 of allocating bandwidth in a network node. The method 600 can be implemented in one or more of the transport elements discussed above. At block 602, add-in traffic is shaped based on the respective traffic class of the data in the add-in traffic, as discussed above. In addition, the add-in traffic is shaped, in some embodiments, based on one or more parameters, such as maximum or minimum bandwidth, received from a master node, as discussed above. At block 604, transit traffic is shaped separately from the add-in traffic based on the respective traffic class of the data in the transit traffic, as discussed above. In addition, the transit traffic is shaped, in some embodiments, based on one or more parameters, such as maximum or minimum bandwidth, received from a master node.

At block 606, the shaped add-in traffic and the shaped transit traffic are shaped together based on respective weights assigned to the add-in traffic and the transit traffic. In some embodiments, the weights are assigned by a master node as discussed above. At block 608, data is optionally blocked at one or more interfaces of a master node to provide a loop free network topology. For example, as discussed above, a first subset of data received in a first direction at the master node is blocked and a second subset of data received at the master node in a second direction is blocked.

Example Embodiments

Example 1 includes a system comprising: a plurality of access nodes configured to provide one or more services to customer equipment; and a plurality of transport elements coupled together to form a network; wherein each transport element is configured to receive data packets committed to the network by one or more of the other transport elements and to commit data packets to the network, each data packet assigned to one of a plurality of traffic classes; wherein each respective transport element is further configured to shape a first set of traffic comprising data packets received from another transport element based on the respective traffic class of each data packet and to shape a second set of traffic comprising data packets to be committed to the network by the respective transport element based on the respective traffic class of each data packet, the first set of traffic shaped separately from the second set of traffic; wherein each respective transport element is further configured to shape the shaped first set of traffic together with the shaped second set of traffic based on respective weights associated with the first set of traffic and the second set of traffic.

Example 2 includes the system of Example 1, wherein each respective transport element is further configured to directly commit priority data packets assigned to a predetermined traffic class from the plurality of traffic classes without shaping the priority data packets regardless of whether the priority data packets are to be committed to the network by the respective transport element or are received from another transport element.

Example 3 includes the system of any of Examples 1-2, wherein the plurality of transport elements are coupled together to form a ring network topology.

Example 4 includes the system of any of Examples 1-2, wherein the plurality of transport elements are coupled together to form a tree network topology.

Example 5 includes the system of any of Examples 1-4, wherein each transport element comprises an integrated aggregation and access node.

Example 6 includes the system of any of Examples 1-5, wherein each respective transport element is configured to shape the shaped first set of traffic together with the shaped second set of traffic via a weighted round robin scheduling.

Example 7 includes the system of any of Examples 1-3 and 5-6, wherein one of the transport elements is a master node configured to distribute the respective weights to each transport element and to distribute respective parameters to each transport element used in shaping the first set of traffic and the second set of traffic.

Example 8 includes the system of Example 7, wherein the network is a ring network and the master node is configured to block data packets on at least one interface to provide a loop free network topology.

Example 9 includes the system of Example 8, wherein the master node is configured to block a first subset of data packets in a first direction and a second set of data packets in a second direction.

Example 10 includes a method of allocating bandwidth in a network node coupled to other network nodes to form a network topology, the method comprising: shaping add-in traffic comprising data to be committed to the network by the network node, the data in the add-in traffic assigned to one or more respective traffic classes, wherein the add-in traffic is shaped based on the respective traffic class of the data in the add-in traffic; shaping transit traffic comprising data received from another transport element, the data in the transit traffic assigned to one or more respective traffic classes, wherein the transit traffic is shaped separated from the add-in traffic based on the respective traffic class of the data in the transit traffic; and shaping the shaped transit traffic together with the shaped add-in traffic based on respective weights associated with the transit traffic and add-in traffic.

Example 11 includes the method of Example 10, further comprising: directly committing priority data from the transit traffic and the add-in traffic to the network, the priority data assigned to a predetermined traffic class.

Example 12 includes the method of any of Examples 10-11, wherein shaping the shaped transit traffic together with the shaped add-in traffic comprises shaping the shaped transit traffic together with the shaped add-in traffic via a weighted round robin scheduling.

Example 13 includes the method of any of Examples 10-12, wherein shaping the add-in traffic further comprises shaping the add-in traffic based on one or more parameters received from a master node; wherein shaping the transit traffic further comprises shaping the transit traffic based on one or more parameters received from the master node; and wherein shaping the shaped transit traffic together with the shaped add-in traffic comprises shaping the shaped transit traffic together with the shaped add-in traffic based on respective weights received from the master node.

Example 14 includes the method of any of Examples 10-13, further comprising: blocking data at one or more interfaces of a master node to provide a loop free network topology.

Example 15 includes the method of Example 14, wherein blocking data comprises blocking a first subset of data received in a first direction at the master node and blocking a second subset of data received at the master node in a second direction.

Example 16 includes a program product comprising a non-transitory processor-readable medium on which program instructions are embodied, wherein the program instructions are configured, when executed by at least one programmable processor, to cause the at least one programmable processor to: shape a first set of data packets obtained from a first plurality of queues based on a respective traffic class of each data packet, each queue in the first plurality of queues corresponding to one of a plurality of traffic classes; shape a second set of data packets separate from the first set of data packets based on a respective traffic class of each data packet in the second set of data packets, the second set of data packets obtained from a second plurality of queues, wherein each queue in the second plurality of queues corresponds to one of the plurality of traffic classes; and shape the shaped first set of data packets together with the shaped second set of data packets based on respective weights associated with the first set of data packets and the second set of data packets.

Example 17 includes the program product of Example 16, wherein the program instructions are further configured to cause the at least one programmable processor to directly commit priority data from the first set of data packets and priority data from the second set of data packets to the network, the priority data assigned to a predetermined traffic class.

Example 18 includes the program product of any of Examples 16-17, wherein the program instructions are further configured to cause the at least one programmable processor to: shape the first set of data packets based on one or more parameters received from a master node; shape the second set of data packets based on one or more parameters received from the master node; and shape the shaped first set of data packets together with the shaped second set of data packets based on respective weights received from the master node.

Example 19 includes the program product of any of Examples 16-18, wherein the program instructions are further configured to cause the at least one programmable processor to block data packets received at one or more interfaces to provide a loop free network topology.

Example 20 includes the program product of Example 19, wherein the program instructions are further configured to cause the at least one programmable processor to block a first subset of data packets received in a first direction and block a second subset of data packets received in a second direction.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system comprising:
  a plurality of access nodes configured to provide one or more services to customer equipment; and
  a plurality of transport elements coupled together to form a network, each of the plurality of transport elements comprising a network node having a processor coupled to a transmitter, a receiver and a memory;
  wherein each transport element is configured to couple the receiver to the network and the transmitter to the network and receive, via the receiver, data packets originally committed to the network by one or more of the other transport elements and to commit, via the transmitter, data packets to the network, each data packet assigned to one of a plurality of traffic classes;

wherein each respective transport element is further configured to shape a first set of traffic comprising transit traffic data packets received from, and originally committed to the network by, another transport element based on the respective traffic class of each data packet and to shape a second set of traffic comprising local traffic data packets to be originally committed to the network by the respective transport element based on the respective traffic class of each data packet, the first set of traffic shaped separately from the second set of traffic;

wherein each respective transport element is further configured to shape the shaped first set of traffic together with the shaped second set of traffic based on respective weights associated with the first set of traffic and the second set of traffic.

2. The system of claim 1, wherein each respective transport element is further configured to directly commit priority data packets assigned to a predetermined traffic class from the plurality of traffic classes without shaping the priority data packets regardless of whether the priority data packets are to be committed to the network by the respective transport element or are received from another transport element.

3. The system of claim 1, wherein the plurality of transport elements are coupled together to form a ring network topology.

4. The system of claim 1, wherein the plurality of transport elements are coupled together to form a tree network topology.

5. The system of claim 1, wherein each transport element comprises an integrated aggregation and access node.

6. The system of claim 1, wherein each respective transport element is configured to shape the shaped first set of traffic together with the shaped second set of traffic via a weighted round robin scheduling.

7. The system of claim 1, wherein one of the transport elements is a master node configured to distribute the respective weights to each transport element and to distribute respective parameters to each transport element used in shaping the first set of traffic and the second set of traffic.

8. The system of claim 7, wherein the network is a ring network and the master node is configured to block data packets on at least one interface to provide a loop free network topology.

9. The system of claim 8, wherein the master node is configured to block a first subset of data packets in a first direction and a second set of data packets in a second direction.

10. A method of allocating bandwidth in a network node coupled to other network nodes to form a network topology, the method comprising:
shaping add-in traffic comprising data to be committed to the network by the network node, the data in the add-in traffic assigned to one or more respective traffic classes, wherein the add-in traffic is shaped based on the respective traffic class of the data in the add-in traffic;
shaping transit traffic comprising data received from another transport element, the data in the transit traffic assigned to one or more respective traffic classes, wherein the transit traffic is shaped separated from the add-in traffic based on the respective traffic class of the data in the transit traffic; and
shaping the shaped transit traffic together with the shaped add-in traffic based on respective weights associated with the transit traffic and add-in traffic.

11. The method of claim 10, further comprising:
directly committing priority data from the transit traffic and the add-in traffic to the network, the priority data assigned to a predetermined traffic class.

12. The method of claim 10, wherein shaping the shaped transit traffic together with the shaped add-in traffic comprises shaping the shaped transit traffic together with the shaped add-in traffic via a weighted round robin scheduling.

13. The method of claim 10, wherein shaping the add-in traffic further comprises shaping the add-in traffic based on one or more parameters received from a master node;
wherein shaping the transit traffic further comprises shaping the transit traffic based on one or more parameters received from the master node; and
wherein shaping the shaped transit traffic together with the shaped add-in traffic comprises shaping the shaped transit traffic together with the shaped add-in traffic based on respective weights received from the master node.

14. The method of claim 10, further comprising:
blocking data at one or more interfaces of a master node to provide a loop free network topology.

15. The method of claim 14, wherein blocking data comprises blocking a first subset of data received in a first direction at the master node and blocking a second subset of data received at the master node in a second direction.

16. A program product comprising a non-transitory processor-readable medium on which program instructions are embodied, wherein the program instructions are configured, when executed by at least one programmable processor, to cause the at least one programmable processor to:
shape a first set of transit traffic data packets obtained from a first plurality of queues based on a respective traffic class of each data packet, each queue in the first plurality of queues corresponding to one of a plurality of traffic classes;
shape a second set of local traffic data packets separate from the first set of transit traffic data packets based on a respective traffic class of each data packet in the second set of local traffic data packets, the second set of local traffic data packets obtained from a second plurality of queues, wherein each queue in the second plurality of queues corresponds to one of the plurality of traffic classes; and
shape the shaped first set of transit traffic data packets together with the shaped second set of local traffic data packets based on respective weights associated with the first set of data packets and the second set of data packets.

17. The program product of claim 16, wherein the program instructions are further configured to cause the at least one programmable processor to directly commit priority data from the first set of transit traffic data packets and priority data from the second set of local traffic data packets to the network, the priority data assigned to a predetermined traffic class.

18. The program product of claim 16, wherein the program instructions are further configured to cause the at least one programmable processor to:
shape the first set of transit traffic data packets based on one or more parameters received from a master node;
shape the second set of local traffic data packets based on one or more parameters received from the master node; and
shape the shaped first set of transit traffic data packets together with the shaped second set of local traffic data packets based on respective weights received from the master node.

19. The program product of claim 16, wherein the program instructions are further configured to cause the at least one programmable processor to block data packets received at one or more interfaces to provide a loop free network topology.

20. The program product of claim 19, wherein the program instructions are further configured to cause the at least one programmable processor to block a first subset of data packets received in a first direction and block a second subset of data packets received in a second direction.

* * * * *